United States Patent
Ottmann et al.

(10) Patent No.: US 10,988,125 B2
(45) Date of Patent: Apr. 27, 2021

(54) FLUID CONTAINER COMPRISING A FLOW-OPTIMISED CONNECTING PIECE

(71) Applicant: Continental Teves AG & Co. oHG, Frankfurt am Main (DE)

(72) Inventors: Swen Ottmann, Frankfurt am Main (DE); Manfred Rüffer, Sulzbach (DE)

(73) Assignee: Continental Teves AG & Co. oHG

( * ) Notice: Subject to any disclaimer, the term of this patent is extended or adjusted under 35 U.S.C. 154(b) by 0 days.

(21) Appl. No.: 16/348,986

(22) PCT Filed: Nov. 13, 2017

(86) PCT No.: PCT/EP2017/079085
§ 371 (c)(1),
(2) Date: May 10, 2019

(87) PCT Pub. No.: WO2018/087371
PCT Pub. Date: May 17, 2018

(65) Prior Publication Data
US 2019/0270439 A1    Sep. 5, 2019

(30) Foreign Application Priority Data
Nov. 11, 2016   (DE) .................... 10 2016 222 148.5

(51) Int. Cl.
*B60T 11/22*   (2006.01)
*B60T 11/26*   (2006.01)
*B60T 17/06*   (2006.01)

(52) U.S. Cl.
CPC ............. *B60T 11/22* (2013.01); *B60T 11/26* (2013.01); *B60T 17/06* (2013.01)

(58) Field of Classification Search
CPC ........... B60T 11/22; B60T 17/06; B60T 11/26
See application file for complete search history.

(56) References Cited

U.S. PATENT DOCUMENTS 2,003,247 A    5/1935    Carroll
3,213,626 A *  10/1965   Shutt ................... B60T 11/22
                                                      60/588
(Continued)

FOREIGN PATENT DOCUMENTS

CN    102897160 A    1/2013
CN    104203675 A    12/2014
(Continued)

OTHER PUBLICATIONS

German Search Report for German Application No. 10 2016 222 148.5, with partial translation, dated Sep. 25, 2017—11 pages.
(Continued)

*Primary Examiner* — Thomas E Lazo
(74) *Attorney, Agent, or Firm* — RatnerPrestia

(57) ABSTRACT

A fluid container having at least one internal chamber for receiving a fluid, and having at least one connector for hydraulically connecting the internal chamber to a downstream hydraulic apparatus, wherein the connector at the end thereof toward the internal chamber has a mouth portion. In order to propose an improved fluid container by way of which high volumetric flows can also pass through the connector at high throughflow rates with low losses and reduced resistance, it is proposed that an escape value of the connector is provided so as to be larger than 0.82, and the mouth portion in relation to a container wall region that directly surrounds the mouth portion is at least in portions designed so as to be raised in the direction of the internal chamber.

11 Claims, 1 Drawing Sheet

(56) References Cited

U.S. PATENT DOCUMENTS

| | | | | |
|---|---|---|---|---|
| 3,479,068 | A | * | 11/1969 | Brittain .................. F16D 65/46 |
| | | | | 285/321 |
| 4,174,786 | A | * | 11/1979 | Fujii ....................... B60T 11/22 |
| | | | | 220/378 |
| 4,294,072 | A | | 10/1981 | Flynn |
| 4,514,983 | A | * | 5/1985 | Gaiser .................... B60T 11/22 |
| | | | | 220/501 |
| 4,841,107 | A | * | 6/1989 | Tandler ................. B60T 17/225 |
| | | | | 200/84 C |
| 5,207,062 | A | | 5/1993 | Wilson et al. |
| 5,254,815 | A | * | 10/1993 | Nakano .................. H01H 36/02 |
| | | | | 200/51 R |
| 5,513,490 | A | | 5/1996 | Howell et al. |
| 6,386,648 | B1 | * | 5/2002 | Wasson ................. B60T 11/232 |
| | | | | 303/113.3 |
| 6,438,955 | B1 | * | 8/2002 | Chiba ..................... B60T 11/20 |
| | | | | 60/578 |
| 6,550,591 | B2 | * | 4/2003 | Honda .................... B60T 11/26 |
| | | | | 188/352 |
| 7,086,229 | B2 | * | 8/2006 | Mallmann ............ B60T 11/232 |
| | | | | 60/585 |
| 7,152,406 | B2 | * | 12/2006 | von Hayn ............. B60T 11/232 |
| | | | | 60/584 |
| 7,640,742 | B2 | * | 1/2010 | Tandler ................. B60T 17/225 |
| | | | | 60/534 |
| 8,615,995 | B2 | | 12/2013 | Neumann et al. |
| 8,813,560 | B2 | * | 8/2014 | Neumann .............. B60T 11/26 |
| | | | | 73/290 R |
| 9,522,662 | B2 | | 12/2016 | Murayama et al. |
| 9,981,641 | B2 | * | 5/2018 | Nakamura ............. B60T 11/22 |
| 2016/0176390 | A1 | * | 6/2016 | Noll ....................... B60T 17/06 |
| | | | | 60/585 |

FOREIGN PATENT DOCUMENTS

| | | | | |
|---|---|---|---|---|
| DE | 7833469 | U1 | | 2/1979 |
| DE | 2940153 | A1 | | 4/1980 |
| DE | 2908329 | A1 | * | 9/1980 ............. B60T 11/26 |
| DE | 2908329 | A1 | | 9/1980 |
| DE | 102007035842 | A1 | * | 12/2008 ............. B60T 17/06 |
| DE | 102007035842 | A1 | | 12/2008 |
| DE | 102007037225 | A1 | | 1/2009 |
| DE | 102013007514 | A1 | | 11/2014 |
| EP | 0049657 | A1 | | 4/1982 |
| EP | 2213537 | A1 | | 8/2010 |
| FR | 2430878 | A1 | | 2/1980 |
| JP | 53132669 | A | | 11/1978 |
| JP | 5410172 | U | | 1/1979 |
| JP | 5571964 | U | | 5/1980 |
| JP | 1129028 | A | | 2/1999 |
| WO | 2016104425 | A1 | | 6/2016 |

OTHER PUBLICATIONS

International Search Report and Written Opinion for International Application No. PCT/EP2017/079085, dated Mar. 2, 2018—8 pages.
Japanese Notice of Reasons for Refusal for Japanese Application No. 2019-524415, dated May 7, 2020 with translation, 5 pages.
Korean Decision for Grant of Patent for Korean Application No. 10-2019-7015201, dated Nov. 2, 2020, with translation, 3 pages.
Chinese Office Action for Chinese Application No. 201780069264.4, dated Nov. 20, 2020 with partial translation, 10 pages.

* cited by examiner

FLUID CONTAINER COMPRISING A FLOW-OPTIMISED CONNECTING PIECE

CROSS REFERENCE TO RELATED APPLICATIONS

This application is the U.S. National Phase application of PCT International Application No. PCT/EP2017/079085, filed Nov. 13, 2017, which claims priority to German Patent Application No. 10 2016 222 148.5, filed Nov. 11, 2016, the contents of such applications being incorporated by reference herein.

FIELD OF THE INVENTION

The invention relates to a fluid container. Fluid containers of this type having connectors for the hydraulic supply of downstream apparatuses are generally known and widely used in diverse forms and embodiments.

BACKGROUND OF THE INVENTION

Such fluid containers are used, for example, as pressurizing medium containers for hydraulic motor vehicle brake systems where said fluid containers serve in particular for supplying classic master brake cylinders which are coupled to a separate booster stage, or combined pressure-generation apparatuses which include the booster stage in an integral manner. The fluid containers herein can be connected to the downstream apparatus by way of hydraulic lines, but said fluid containers are mostly fastened directly to the hydraulic apparatus. The connectors herein, apart from the function thereof as a hydraulic interface, also have a fastening function in that said connectors are received in corresponding connector receptacles on the connected apparatus and fully or partially assume the positional securing of the fluid container in the vehicle.

Diverse requirements are therefore set in terms of the geometry and shape of the connectors. On the one hand, a sufficiently large cross section for a flawless throughflow of the pressurizing medium has to be made available in the case of all operating conditions and at all temperatures, and the height, or the axial length, respectively, of the connector and the stability have to be designed such that said connector is guaranteed to hold and seal in a reliable manner, on the other hand. The production herein is to be as simple as possible. Against this background, connectors in the manner of cylindrical attachment pipes have in particular established themselves.

The modern highly automated and highly dynamic brake apparatuses in particular require relatively large quantities of readily flowing pressurizing medium within relatively short temporal intervals, this leading to high volumetric flows and throughflow rates in the connectors. High volumetric flows at high throughflow rates can cause various negative effects in the known and relatively narrow cylindrical connectors. Said negative effects include, for example, turbulences on the mouth edge of the connector in the internal chamber and, on account thereof, increased internal fluid friction, thus higher resistance, a creation of cavity regions having an associated generation of noise and formation of gas bubbles, a formation of inflow vortices in the internal chambers of the fluid container which drag the air thereinto and can optionally affect other components such as floats of sensor devices.

From DE 10 2007 037 225A1, incorporated herein by reference, it is known for the mouth edge of the connector to be slightly radiused so as to improve the flow behavior and to address the aforementioned negative effects. However, only a relatively minor improvement can be achieved by blunting the edges in such a manner. A further aspect to be considered is that dirt particles can accumulate and be deposited over time in a pressurizing medium container. The access of dirt to the downstream apparatus is to be minimized or prevented as far as possible; a radiused feature of this type does not prevent this and may even facilitate this because the dirt is suctioned from the surrounding wall region of the fluid container and entrained by the flow.

SUMMARY OF THE INVENTION

An aspect of the invention is an improved fluid container by way of which the aforementioned disadvantages and the negative effects are prevented or at least minimized even in the case of high volumetric flows and at high throughflow rates through the connector.

An aspect of the invention provides that the connector is configured so as to have the escape value $\mu$ of more than 0.82, and the mouth portion of said connector in relation to a container wall region that directly surrounds the mouth portion is at least in portions designed so as to be raised in the direction of the internal chamber.

Apart from achieving a particularly high flow optimization by forming a wide inflow funnel, a type of dam by way of which the suctioning of deposited contaminants into the connector is prevented is contemporaneously formed thereby.

For this purpose, the mouth portion has an encircling bead, according to a refinement of an aspect of the invention, which is contiguous to the container wall region and in relation to the latter is raised in the direction of the internal chamber.

On account thereof, the production capability of the fluid container is not made more difficult, and the strength in the mechanically highly stressed region of the link between the connector and the fluid container is increased on account of the more favorable flow of force profile.

An aspect of the invention furthermore provides that the mouth portion in the axial section thereof has a concave internal profile that is particularly aerodynamic.

For a particularly simple production, maximization of the throughflow cross section, a simplified sealing capability, and high stability of the connector, an aspect of the invention furthermore provides that the connector is configured so as to be substantially rotationally symmetrical about a longitudinal axis L.

In order to nevertheless be able to fully extract the fluid from the fluid container despite the raised shape of the mouth portion, it is provided in one embodiment according to an aspect of the invention that at least one recess which is directed so as to be axial to the container wall region and intersects the bead in the radial direction is disposed in the bead. A passage of fluid transversely through the bead is thus enabled, even when the fluid filling level drops below the level of the upper bead rim.

According to another refinement, the connector can have a shaft region having at least one collar for axially fixing an elastomeric sealing plug which collar is configured so as to be directed in a radially outward manner, on account of which fixing of the connector in a component connected to the connector is enabled in a manner that is reliable and effective in terms of sealing, said fixing of the connector being enabled in, for example, a hydraulic apparatus, an adapter, or a fitting of a hydraulic line.

According to one preferred embodiment of an aspect of the invention, the fluid container is configured as a pressurizing medium container of a hydraulic motor vehicle brake system, wherein the connector is provided for feeding a pressurized chamber in the hydraulic apparatus with a hydraulic pressurizing medium.

According to one refinement of an aspect of the invention, the fluid container can also have two or more connectors of equivalent design.

The hydraulic apparatus herein, according to one particularly preferred embodiment, can be an apparatus for generating a hydraulic braking pressure in the motor vehicle brake system, for example a master brake cylinder, or can be an externally driven pressure-generation apparatus having an integrated booster stage.

BRIEF DESCRIPTION OF THE DRAWINGS

Further features, advantages, and potential applications of aspects of the invention are derived from the following description of an exemplary embodiment according to the invention. In the figures.

DETAILED DESCRIPTION OF THE PREFERRED EMBODIMENTS

FIG. 1

Figure 1:
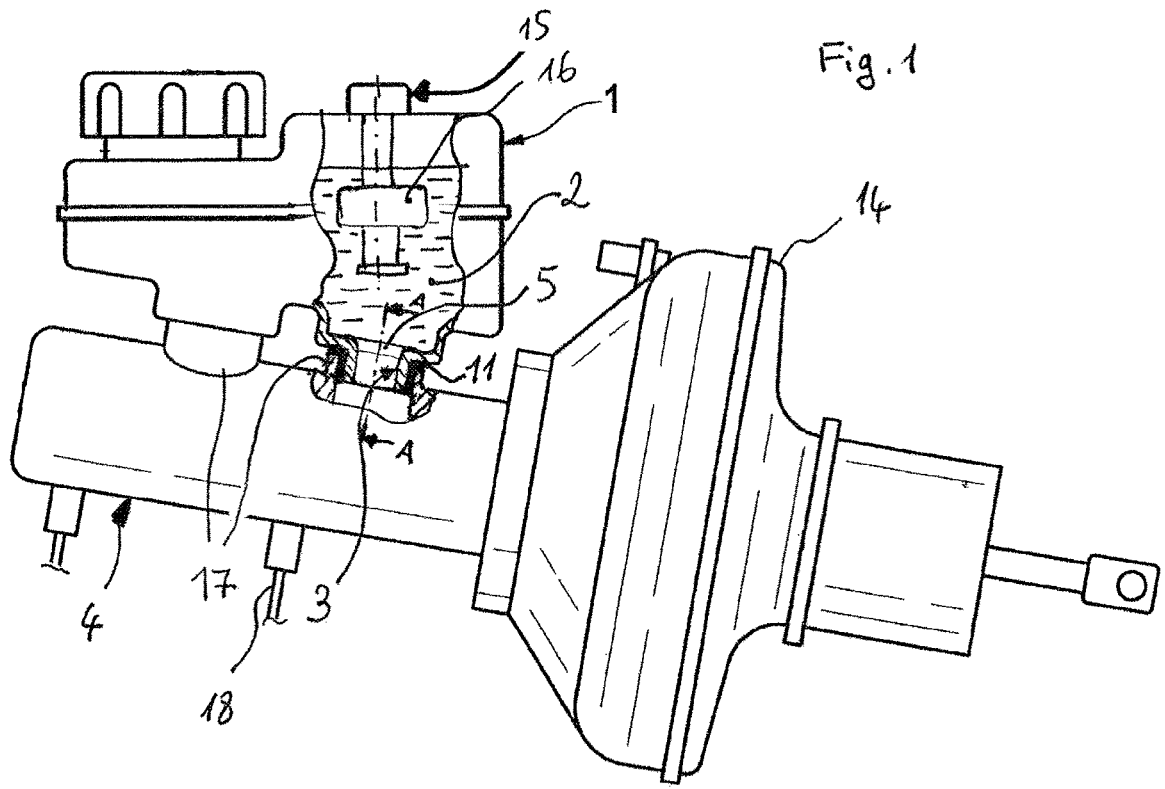
FIG. 1 shows in an exemplary manner a simplified illustration of an embodiment of the fluid container according to an aspect of the invention as a pressurizing medium container for a hydraulic motor vehicle brake system.

The fluid container 1 according to an aspect of the invention in the embodiment shown is configured as a pressurizing medium container and is disposed directly on a hydraulic apparatus 4 for generating the hydraulic braking pressure in a hydraulic motor vehicle brake system. The fluid container 1 is configured from plastics material, so as to be relatively thin-walled, and has an internal chamber 2 which is filled with a fluid pressurizing medium. A connector 3 which is internally hollow and by way of the mouth portion 5 thereof opens into the internal chamber 3 enables a hydraulic connection between the internal chamber 2 and a chamber (not shown) which is disposed in the interior of the hydraulic apparatus 4 and has a variable volume, the pressurizing medium being suctioned from the internal chamber 2 through the connector 3 in the case of the volumetric reduction of said chamber. A hydraulic line 18 connects the hydraulic apparatus 4 to a wheel brake (likewise not shown) or to another interposed hydraulic apparatus.

The connector 3 is received in a connector receptacle 17 that is molded on the hydraulic apparatus 4, and is fixed in a sealing manner therein by means of an elastomeric sealing plug 11.

The fluid container 1 in the embodiment shown has a total of two connectors 3 of equivalent embodiment, wherein only one of the latter is shown for the sake of simplification. A deviating number and/or optionally a ratio between the connectors with respect to one another is furthermore permissible within an aspect of the invention.

Furthermore, a sensor device 15 which, for example, monitors the fluid filling level by means of a transducer that is configured as a float 16 can be disposed within the internal chamber 2.

FIG. 2

Figure 2:
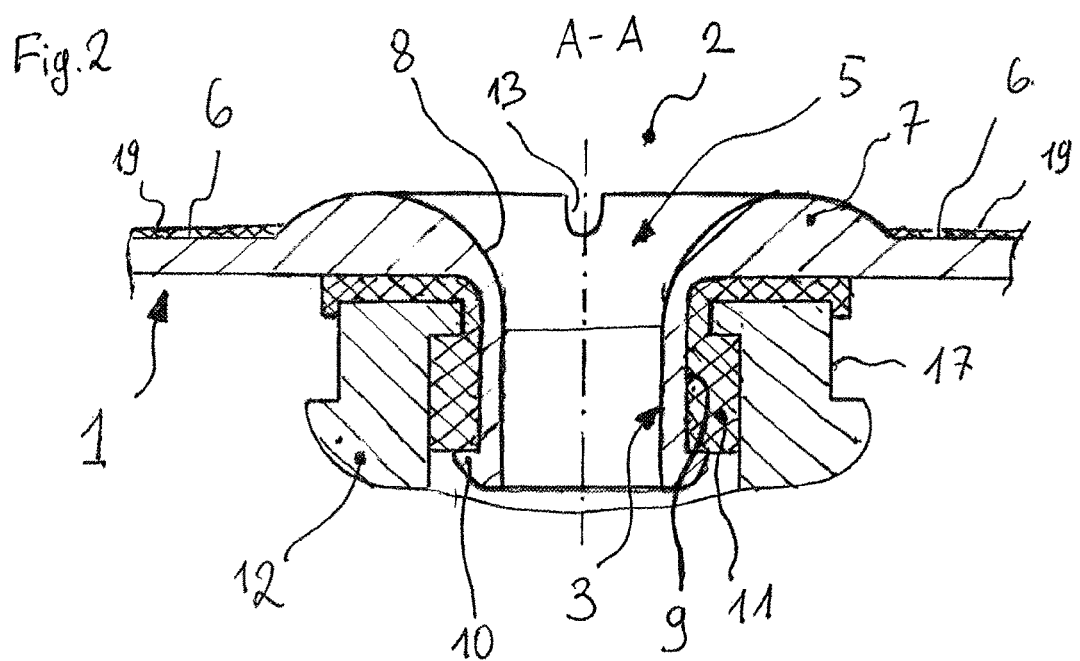
FIG. 2 shows an enlarged sectional illustration of the connector of the embodiment according to FIG. 1.

FIG. 2 shows in the connector 3 as per FIG. 1 in the section A-A. The connector 3 is configured so as to be substantially rotationally symmetrical about the longitudinal axis L of said connector 3. Said connector 3 possesses a mouth portion 5, by way of which said connector 3 opens into the internal chamber 2, and a tubular cylindrical shaft region 9 on which the sealing plug 11 bears. A collar 10 which in the shaft region is configured so as to be directed in a radially outward manner prevents the sealing plug 11 from sliding off the connector 3.

The connector 3 by way of the shaft region 9 thereof is positioned within the corresponding connector receptacle 17; the sealing plug 11 herein serves for sealing the present interface and for fixing the connector 3 in the connector receptacle 17 and thus also for positionally securing the entire fluid container 1. In principle, the connector receptacle 17 herein can be disposed in an arbitrary component 12. The hydraulic apparatus 4 in the exemplary embodiment shown represents per se the component 12, wherein it is readily permissible within an aspect of the invention that the component 12 can be, for example, a hydraulic line, an adapter, a fitting, or the like.

In the mechanics of fluids an escape value $\mu$ is used in principle for characterizing the flow quality of outflow openings, said escape value $\mu$ indicating an actual volumetric flow as a proportion of the theoretically possible volumetric flow through the opening. It applies here that the lower the escape value $\mu$ the larger the loss and the inferior the hydrodynamics and the flow quality. The escape value $\mu$ assumes specific characteristic values for different outflow opening shapes, and for a simple cylindrical attachment pipe having a length-to-diameter ratio of 2 to 3 and sharp edges, for example, is $\mu=0.82$ or 82%, respectively. Conversely, this means a loss of 18% of the volumetric flow in the case of this specific shape geometry of the outflow opening.

In order for the escape value $\mu$ to be increased so as to improve the hydrodynamics by reducing flow resistances, the mouth portion 5 is configured so as to be substantially funnel-shaped having a relatively wide funnel that is radially very elongate. In order for this shape to be implemented, the mouth portion 5 has an encircling bead 7 which is contiguous to the substantially flat container wall region 6 that surrounds the connector 3 and in relation to said flat container wall region 6 is raised in the direction of the internal chamber 2. On account thereof, the internal profile 8 of the mouth portion 5, in the axial section thereof through the longitudinal axis L, is configured so as to be concave and has a substantially larger radius than would be possible in the case of a simple radiusing of the edges, and is thus designed so as to be particularly aerodynamic. On account of this shaping, an escape value $\mu$ in the range of 0.97 to 0.99 can be achieved, and flow losses can thus be reduced to 1 to 3.

On account of the design of the mouth portion 5 which is raised in relation to the surrounding container wall region 6 it is moreover achieved that the dirt layer 19 deposited in the fluid container 1 is not dragged along by the flow and suctioned into the connector 3, because the bead 7 herein acts in the manner of a dam.

In order for the fluid nevertheless to be able to be fully extracted from the fluid container 1 in specific circumstances, for example for emergency braking in the event of a system leakage and a loss of fluid, a recess 13 which intersects the bead 7 in the radial direction like a groove and is routed axially up to the container wall region 6 can be provided. Even the last fluid remnants can make their way into the connector 3 by way of the recess 13. However, on account of the relatively narrow width of the recess 13, the quantity of contaminants conjointly introduced from the dirt layer 19 in the regular operation remains negligibly minor.

LIST OF REFERENCE SIGNS

1 Fluid container
2 Internal chamber
3 Connector
4 Hydraulic apparatus
5 Mouth portion
6 Container wall region
7 Bead
8 Internal profile
9 Shaft region
10 Collar
11 Sealing plug
12 Component
13 Recess
14 Booster stage
15 Sensor device
16 Float
17 Connector receptacle
18 Hydraulic line
19 Dirt layer
μ Escape value
L Longitudinal axis

The invention claimed is:

1. A fluid container having at least one internal chamber for receiving a fluid, and having at least one connector for hydraulically connecting the internal chamber to a downstream hydraulic apparatus, wherein the connector at the end thereof toward the internal chamber has a mouth portion, wherein the connector has an opening shape with an escape value of more than 0.82, and the mouth portion in relation to a container wall region that directly surrounds the mouth portion is at least in portions designed so as to be raised in the direction of the internal chamber.

2. The fluid container as claimed in claim 1, wherein the container wall region is a flat container wall region, and the mouth portion has an encircling bead which is contiguous to the flat container wall region and is raised in the direction of the internal chamber relative to the contiguous flat container wall region.

3. The fluid container as claimed in claim 2, wherein at least one recess which is directed so as to be axial to the container wall region and intersects the bead in the radial direction is disposed in the bead.

4. The fluid container as claimed in claim 1, wherein the mouth portion in the axial section thereof has a concave internal profile.

5. The fluid container as claimed in claim 1, wherein the connector is configured so as to be substantially rotationally symmetrical about a longitudinal axis L.

6. The fluid container as claimed in claim 1, wherein the connector has a shaft region having at least one collar for axially fixing an elastomeric sealing plug on the connector which collar is configured so as to be directed in a radially outward manner, wherein the sealing plug is provided for sealing an interface between the connector and a component that is connected to the connector.

7. The fluid container as claimed in claim 6, wherein the component is the hydraulic apparatus.

8. The fluid container as claimed in claim 1, wherein the fluid container is configured as a pressurizing medium container of a hydraulic motor vehicle brake system, and the connector is configured for feeding a pressurized chamber in the hydraulic apparatus with a hydraulic pressurizing medium.

9. The fluid container as claimed in claim 8, wherein the hydraulic apparatus is an apparatus for generating a hydraulic braking pressure in the motor vehicle brake system.

10. The fluid container as claimed in claim 1, wherein the fluid container has two connectors of equivalent design.

11. The fluid container as claimed in claim 1, wherein the mouth portion of the connector is configured to be substantially funnel-shaped.

\* \* \* \* \*